United States Patent [19]

Taylor et al.

[11] 4,442,235

[45] Apr. 10, 1984

[54] PROCESS AND COMPOSITION FOR THE PRODUCTION OF POLYURETHANE ELASTOMER MOLDINGS

[75] Inventors: Ronald P. Taylor, Coraopolis; John E. Dewhurst, Oakdale; Saad M. Abouzahr, Coraopolis, all of Pa.

[73] Assignee: Mobay Chemical Corporation, Pittsburgh, Pa.

[21] Appl. No.: 492,923

[22] Filed: May 9, 1983

[51] Int. Cl.³ ............................................. C08G 18/14
[52] U.S. Cl. .................................... 521/122; 252/182; 521/163; 521/176; 528/48; 528/76; 528/77
[58] Field of Search ....................... 521/163, 122, 176; 528/76, 85, 48, 77; 252/182

[56] References Cited

U.S. PATENT DOCUMENTS 4,288,564 9/1981 Conover et al. ...................... 521/99

Primary Examiner—Maurice J. Welsh
Attorney, Agent, or Firm—Gene Harsh; Joseph C. Gil

[57] ABSTRACT

The present invention is directed to a process for the production of polyurethane elastomer moldings by reacting a reaction mixture in a closed mold, wherein said reaction mixture comprises:
 (a) an organic polyisocyanate;
 (b) an organic active hydrogen group-containing compound having a molecular weight of from 1800 to 12,000 and containing at least two active hydrogen groups;
 (c) 1,3,5-triethyl-2,6-diamino benzene and, optionally
 (d) a catalyst for the reaction between hydroxyl groups and isocyanate groups, wherein component (c) is present in an amount of from 25 to 35 percent by weight based on the combined weight of components (b) and (c), wherein the amounts of components (a), (b) and (c) are such that the isocyanate index of the reaction mixture is from about 90 to 110, and wherein all of said components are processed via a one-shot process whereby (a) is mixed simultaneously either with (b), (c) and (d) or with a non-reacted premixture of some or all of (b), (c) and (d).

14 Claims, No Drawings

PROCESS AND COMPOSITION FOR THE PRODUCTION OF POLYURETHANE ELASTOMER MOLDINGS

BACKGROUND OF THE INVENTION

Diethyl toluene diamine (DETDA) is currently being used on a large commercial scale as a chain extender for the production of polyurethane elastomer moldings via the RIM process. Formulations utilizing DETDA allow for fast demold times and high productivity because of the high reactivity of DETDA with aromatic isocyanates. However, the concentration of DETDA that can be used in a formulation is limited by the high reactivity of the DETDA. In fact, in commercial applications, concentrations higher than about 23 to 25 percent by weight (based on the total weight of all the active hydrogen containing components in the reaction mixture) cause such fast gelation that even simple molds cannot be filled uniformly. While increasing the DETDA concentration will result in an increase in flexural modulus (or stiffness), the resultant molded part is also unacceptably brittle.

The formulations based on DETDA as a chain extender are therefore restricted to the lower flexural modulus range (i.e., less than about 70,000 psi at room temperature). As is known in the art, flexural modulus could be raised through the use of a co-chain extender, such as ethylene glycol or 1,4-butane diol with DETDA. However, when such co-chain extenders are used the thermal properties of the molded part such as heat sag and flexural modulus at high or low temperatures are generally adversely affected.

It is therefore an object of the present invention to provide higher flexural modulus polyurethane elastomer moldings. It is a further object of the invention to provide such formulations which give acceptable flowability in complicated molds, and which are not brittle at or following demold.

The use of DETDA in the production of polyurethane elastomer moldings has been described in U.S. Pat. Nos. 4,218,543, 4,288,564, 4,298,701 and 4,296,212; U.S. Application Ser. No. 288,222, filed July 29, 1981 and now U.S. Pat. No. 4,379,105; and British Pat. No. 1,534,258. Furthermore, each of these references do broadly suggest the use of 1,3,5-triethyl-2,6-diamino benzene. In the '543 patent, note column 10, lines 1 and 2, and Claims 4 and 18; in the '564 patent, note column 8, line 22; in the '701 patent, note column 7, line 20; in the '212 patent, note column 4, line 54; in the British patent, note page 7, line 3; and in the U.S. application, note page 17, line 32 and Claim 2.

Finally, the use of both DETDA and 1,3,5-triethyl-2,6-diamino benzene in a prepolymer process has been described in U.S. Pat. No. 3,428,610 (note particularly, column 4, lines 22-23; column 5, lines 7 and 8; and Example 9H).

DESCRIPTION OF THE INVENTION

It has been unexpectedly discovered that a close structural analog of DETDA, 1,3,5-triethyl-2,6-diamino benzene (hereinafter referred to as TEMPDA) can be used in significantly higher concentrations than DETDA to produce parts of relatively higher flexural modulus (i.e., higher than about 70,000 psi at room temperature) without problems associated with brittleness and poor flowability. It is generally recognized that greater steric hindrance adjacent to the amino groups of an aromatic amine will decrease its reactivity towards isocyanates. However, it was totally unexpected that such a subtle structural change (i.e., from 1-methyl-3,5-diethyl diaminobenzene to 1,3,5-triethyl diaminobenzene) would lead to such a significant difference in reactivity, which allows a significantly higher concentration of TEMPDA to be used. The advantages of using TEMPDA over DETDA occurs at relatively high concentrations, i.e., from 25 to 35 percent by weight (based on the total weight of all the active hydrogen containing components in the reaction mixture). The higher concentrations of TEMPDA that can be used (relative to DETDA) allows for the development of higher flexural modulus formulations than would be possible with the DETDA alone.

The present invention is therefore directed to an improved process for the production of polyurethane elastomer moldings by reacting a reaction mixture in a closed mold, the improvement wherein said reaction mixture comprises (a) an organic polyisocyanate,
(b) an organic active hydrogen group containing a compound having a molecular weight of from 1800 to 12,000 and containing at least two active hydrogen groups
(c) 1,3,5-triethyl-2,6-diamino benzene, and optionally
(d) a catalyst for the reaction between hydroxyl groups and isocyanate groups;

wherein component (c) is present in an amount of from about 25 to 35 percent by weight based on the weight of components (b) and (c), wherein the isocyanate index of the reaction mixture is from 70 to 130, and wherein all of said components are processed via a one-shot process whereby (a) is mixed simultaneously either with (b), (c) and (d) or with a non-reacted premixture of some or all of (b), (c) and (d).

In some cases, a low molecular weight hydroxy functional organic compound (or co-chain extender) having from 2 to 4 hydroxyl groups can be added to the reaction mixture in an amount of from 0 to 95 percent by weight based on the combined weight of TEMPDA and the co-chain extender. In the case of such use, the TEMPDA can be used in an amount outside the range of 25 to 35 percent by weight, provided that the combined weight of the TEMPDA and the co-chain extender is within the range of 25 to 35 percent by weight based on the combined weight of component (b), TEMPDA and co-chain extender.

The present invention is also directed to an active hydrogen group-containing blend for use in the production of polyurethane moldings comprising: (i) an organic active hydrogen group-containing compound having a molecular weight of from 1800 to 12,000, and, (ii) from about 25 to about 35 by weight, based on the weight of (i) and (ii) of 1,3,5-triethyl-2,6-diamino benzene. Finally, the present invention is directed to an active hydrogen group-containing blend for use in the production of polyurethane moldings comprising (i) an organic active hydrogen group-containing compound having a molecular weight of from 1800 to 12,000, (ii) 1,3,5-triethyl-2,6-diamino benzene, and (iii) from 0 to 95 percent by weight based on the combined weight of (ii) and (iii) of a low molecular weight hydroxy functional organic compound having from 2 to 4 hydroxyl groups, wherein the total weight of (ii) and (iii) is from about 25 to about 35 percent based on the weight of (i), (ii) and (iii).

Starting polyisocyanate components suitable for use in the present invention include aliphatic, cycloaliphatic, araliphatic, aromatic and heterocyclic polyisocyanates of the type described, for example, by W. Siefken in Justus Liebigs Annalen der Chemie, 562, pages 75 to 136. Specific examples of these compounds are ethylene diisocyanate; 1,4-tetramethylene diisocyanate; 1,6-hexamethylene diisocyanate; 1,12-dodecane diisocyanate; cyclobutane-1,3-diisocyanate, cyclohexane-1,3- and -1,4-diisoisocyanate and mixtures of these isomers. Additional examples are 1-isocyanato-3,3,5-trimethyl-5-isocyanato-methyl cyclohexane (German Auslegeschrift No. 1,202,785, U.S. Pat. No. 3,401,190), 2,4- and 2,6-hexahydro-tolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 1,4- and 2,6-tolylene diisocyanate and mixtures of these isomers are also suitable in the instant invention. Diphenylmethane-2,4- and/or -4,4'-diisocyanate; naphthylene-1,5-diisocyanate; triphenyl methane-4,4',4''-triisocyanate; polyphenyl polymethylene polyisocyanates of the type obtained by condensing aniline with formaldehyde, followed by phosgenation and described, for example, in British Pat. Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,902,007 (U.S. Pat. No. 3,152,162); diisocyanates of the type described in U.S. Pat. No. 3,492,330; and polyisocyanates containing allophanate groups of the type described, for example, in British Pat. No. 993,890, in Belgian Pat. No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Pat. Nos. 1,022,789; 1,222,067 and 1,027,394 and in German Offenlegungsschriften Nos. 1,929,034 and 2,004,408; polyisocyanates containing urethane groups of the type described, for example, in Belgian Pat. No. 752,261 or in U.S. Pat. No. 3,394,164; polyisocyanates containing acylated urea groups according to German Pat. No. 1,230,778 and polyisocyanates containing biuret groups of the type described, for example, in German Pat. No. 1,101,394 (U.S. Pat. Nos. 3,124,605 and 3,201,372) and in British Pat. No. 889,050 are also suitable.

Polyisocyanates produced by telomerization reactions of the type described, for example, in U.S. Pat. No. 3,654,106; polyisocyanates containing ester groups of the type described for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385 and polyisocyanates containing polymeric fatty acid residues, according to U.S. Pat. No. 3,455,883 are still further examples of suitable isocyanates.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Pat. No. 1,618,380 (U.S. Pat. No. 3,644,457). These may be produced, for example, by reacting 1 mol of 4,4'-diisocyanato-diphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Pat. No. 1,092,007 (U.S. Pat. No. 3,152,162). Mixtures of these preferred polyisocyanates can also be used. In general, aliphatic and cycloaliphatic isocyanates are less suitable for the purposes of the instant invention.

The organic active hydrogen group-containing compounds having moleculr weights of from 1800 to 12,000 include compounds containing amino groups, thiol groups, carboxyl groups and hydroxyl groups.

The compounds used as component (b) in the process according to the present invention are preferably polyhydroxyl polyethers or polyamino polyethers having molecular weights of from 1800 to 12,000, and most preferably from 3000 to 7000. Polyethers are particularly suitable for the process of the present invention. Preferred are those having at least 2, and preferably 2 or 3 hydroxyl or amino groups. Polyhydroxyl polyethers are known and may be prepared, e.g., by polymerization of epoxides, such as ethylene oxide, propylene oxide, butylene oxide, tetrahydrofuran, styrene oxide or epichlorohydrin, either on their own, e.g., in the presence of $BF_3$, or by a process of chemical addition of these epoxides, optionally as mixtures or successively, to starting components having reactive hydrogen atoms, such as water, ammonia, alcohols, or amines. Examples of suitable starting components include ethylene glycol, propylene glycol-(1,3) or -(1,2), trimethylolpropane, 4,4'-dihydroxydiphenyl propane, aniline, ethanolamine or ethylene diamine. Sucrose polyethers which have been described in German Auslegschriften No. 1,176,358 and No. 1,064,938 may also be used according to the present invention. It is in many cases preferred to use polyethers which contain predominant amounts of primary OH groups (up to 90%, by weight, based on all the OH groups present in the polyether). Polyethers modified with vinyl polymers are also suitable. These may be obtained, for example, by the polymerization of styrene and acrylonitrile in the presence of polyethers (U.S. Pat. Nos. 3,383,351; 3,304,273; 3,523,083 and 3,110,695; and German Pat. No. 1,152,536). Polybutadienes having OH groups may also be used.

According to the present invention, however, there may also be used polyhydroxyl compounds which contain high molecular weight polyadducts or polycondensates in a finely dispersed form or in solution. Such modified polyhydroxyl compounds are obtained when polyaddition reactions (e.g., reactions between polyisocyanates and amino functional compounds) or polycondensation reactions (e.g., between formaldehyde and phenols and/or amines) are directly carried out in situ in the above-mentioned hydroxyl compounds. Processes for the production of this type of material have been described in German Auslegschriften Nos. 1,168,075 and No. 1,260,142 and in German Offenlegungsschriften Nos. 2,324,134; 2,423,984; 2,512,385; 2,513,815; 2,550,796; 2,550,797; 2,550,833 and 2,550,862. Such polyhydroxyl compounds may also be obtained according to U.S. Pat. No. 3,869,413 or German Offenlegungschrift No. 2,550,860 by mixing an aqueous polymer dispersion with a polyhydroxyl compound and then removing water from the mixture.

According to the present invention, hydroxyl-containing polyesters, polythioethers, polyacetals, polycarbonates or polyester amides of the type known for the production of both homogeneous and cellular polyurethanes may also be used instead of or together with polyether polyols.

Suitable polyesters containing hydroxyl groups include, reaction products of polyhydric, (preferably dihydric alcohols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g., by halogen atoms, and/or may be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic and terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxymethylcyclohexane), 2-methyl-1,3-propane-diol, glycerol, trimethylolpropane, hexanetriol-(1,2,6), butanetriol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as ε-caprolactone or hydroxycarboxylic acids such as ω-hydroxycaproic acid may also be used.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythiomixed ethers, polythioether esters or polythioether ester amides, depending on the co-components.

Suitable polyacetals include, for example, the compounds which may be prepared from glycols, such as diethylene glycol, triethylene glycol, 4,4'-dioxethoxy-diphenyldimethyl methane and hexanediol, and formaldehyde. Suitable polyacetals for the purpose of the present invention may also be prepared by the polymerization of cyclic acetals.

The polycarbonates containing hydroxyl groups used may be of the type known. Highly useful are those which may be prepared by the reaction of diols, such as propanediol-(1,3), butane-(1,4) and/or hexanediol-(1,6), diethylene glycol, triethylene glycol or tetraethylene glycol with diarylcarbonates, e.g. diphenylcarbonate, or phosgene.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines and mixtures thereof.

Representatives of the hydroxyl functional compounds which may be used according to the present invention are generally known and have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, on pages 45 to 71.

Also preferred are polyethers containing primary and/or secondary (preferably primary) aromatically or aliphatically (preferably aliphatically) bound amino groups.

Compounds containing amino end groups may also be attached to the polyether chain by urethane or ester groups. These "amino polyethers" may be prepared by known methods. One such method is the amination of polyhydroxy polyethers (e.g., polypropylene glycol ethers) by a reaction with ammonia in the presence of Raney nickel and hydrogen (Belgian Pat. No. 634,741). U.S. Pat. No. 3,654,370 discloses the preparation of polyoxyalkylene polyamines by reaction of the corresponding polyol with ammonia and hydrogen in the presence of a nickel, copper or chromium catalyst. The preparation of polyethers containing amino end groups by the hydrogenation of cyanoethylated polyoxypropylene ethers is described in German Pat. No. 1,193,671. Other methods for the preparation of polyoxyalkylene (polyether) amines are described in U.S. Pat. Nos. 3,155,728 and 3,236,895 and French Pat. No. 1,551,605. French Pat. No. 1,466,708, discloses the preparation of polyethers containing secondary amino end groups.

Relatively high molecular weight polyhydroxypolyethers suitable for the process of the present invention may be converted into the corresponding anthranilic acid esters by reaction with isatoic acid anhydride. German Offenlegungsschriften Nos. 2,019,432 and 2,619,840 and U.S. Pat. Nos. 3,808,250; 3,975,428 and 4,016,143 disclose methods for making polyethers containing aromatic amino end groups.

Relatively high molecular weight compounds containing amino end groups may be obtained according to German Offenlegungsschrift Nos. 2,546,536 or U.S. Pat. No. 3,865,791 by reacting isocyanate prepolymers based on polyhydroxy polyethers with hydroxyl-containing enamines, aldimines or ketimines and hydrolyzing the reaction product.

The aminopolyethers which have been obtained by the hydrolysis of compounds containing isocyanate end groups are preferred starting materials (German Offenlegungsschrift No. 2,948,419). Polyethers preferably containing two or three hydroxyl groups are reacted (in the process disclosed in German Offenlegungsschrift No. 2,948,419) with polyisocyanates to form isocyanate prepolymers and the isocyanate group is then converted in a second step into an amino group by hydrolysis.

The "amino polyethers" used in the present invention are in many cases mixtures of the compounds described above. These mixtures generally should contain (on a statistical average) two to three isocyanate reactive end groups.

In the process of the present invention, the "amino polyethers" may also be used as mixtures with polyhydroxyl polyethers which are free from amino groups.

In the process according to the present invention, component (b) preferably consists of the classical polyether polyols of polyurethane chemistry or of the above noted polyether polyamines having molecular weights of from 1800 to 12,000, preferably from 3000 to 7000, and containing two or three hydroxyl or amino groups. Mixtures of polyethers, of course, may also be used.

Catalyst (d), is essential to the present invention in the case wherein component (b) is a hydroxyl functional compound or wherein a hydroxyl group containing co-chain extender is used. In these cases, it is not possible without catalyst (d) to obtain a molding which sets rapidly in the mold and has technologically interesting mechanical properties, are preferably selected from the group of organic metal compounds known for use in polyurethane chemistry. According to the present invention, it is preferred to use organic tin compounds such as tin(II) salts of carboxylic acids, (such as tin(II)acetate, tin(II)octoate, tin(II)ethyl hexoate or tin(II)laurate), and the dialkyl tin salts of carboxylic acids (such as dibutyl tin diacetate, dibutyl tin dilaurate, dibutyl tin maleate or dioctyl tin diacetate) either alone or most preferably as a complex with amidines, such as 2,3-dimethyl-3,4,5,6-tetrahydropyrimidine or 2-methyl-3-cyclohexyl-3,4,5,6-tetrahydropyrimidine, aminopyridines, aminopyrimidines, hydrazino pyridines or hydrazino pyrimidines. Synergistically acting catalysts combinations of this type are known and have been described, for example, in German Offenlegungsschriften Nos. 2,434,185; 2,601,082 and 2,603,834.

Other catalysts which may be used include: known tertiary amines, such as triethylamine, tributylamine, N-methylmorpholine, N-ethylmorpholine, N-cocomorpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine, bis-(N,N-diethylaminoethyl)-adipate, N,N-diethylbenzylamine, pentamethyl-diethylene-triamine, N,N-dimethylcyclohexylamine, N,N,N',N'-tetramethyl-1,3-butanediamine, N,N-dimethyl-β-phenylethylamine, 1,2-dimethylimidazole and 2-methylimidazole. A preferred catalyst of this type is 1,4-diaza-bicyclo-(2,2,2)-octane.

Tertiary amines having isocyanate-reactive hydrogen atoms include, e.g. triethanol-amine, triisopropanol-amine, N-methyl-diethanolamine, N-ethyl-diethanolamine, and N,N-dimethyl-ethanolamine may also be used. Reaction products of these compounds with alkylene oxides, such as propylene oxide and/or ethylene oxide are also suitable.

Silaamines having carbon-silicone bonds as described, e.g. in German Patent No. 1,229,290 may also be used as catalysts. Examples include 2,2,4-trimethyl-2-sila-morpholine or 1,3-diethylaminomethyl-tetramethyl-disiloxane.

Basic nitrogen compounds, such as tetralkylammonium hydroxides, alkali metal hydroxides, such as sodium hydroxide, alkali metal phenolates, such as sodium phenolate, and alkali metal alcoholates, such as sodium methylate, may also be used as catalysts. Hexahydrotriazines are also suitable catalysts.

The above-mentioned catalysts may be used alone, (e.g., most preferably 1,4-diaza-bicyclo-(2,2,2)-octane) or in combination with organic metal compounds, and in particular the organic tin compounds noted above.

Other representatives of catalysts which may be used according to the present invention and details concerning the action of the catalysts may be found, e.g., in Kunststoff-Handbuch, Volume VII, published by Vieweg and Hochtlen, Carl-Hanser-Verlag, Munich, 1966, pages 96 to 102.

When used, the catalysts to be used according to the present invention should accelerate the polyaddition reaction to such an extent that once the starting components have been mixed the reactive mixture has a flow time (e.g., the capability to flow and hence the time during which the mixture may still be delivered) of less than 5, 10 or 15 seconds, and demolding times of less than 30 seconds. In general, these can be attained by using from 0.001 to 10 percent by weight of catalyst based on the total weight of component (b).

As noted herein, in some cases it is desirable to utilize a low molecular weight hydroxyl functional organic compound (or co-chain extender) having from 2 to 4 hydroxyl groups.

Compounds containing at least two hydroxyl groups and having a molecular weight of from 32 to 600 may be used in the present invention as chain-extenders or cross-linkers. These co-chain extenders and cross-linking agents generally contain from 2 to 4 isocyanate-reactive hydrogen atoms. Mixtures of different compounds containing at least two hydroxyl groups and having a molecular weight of from 32 to 600 may also be used.

Examples of such low molecular weight compounds are ethylene glycol, 1,2- and 1,3propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, castor oil, diethylene glycol, triethylene glycol, tetraethylene glycol, higher polyethylene glycols having a molecular weight of up to 600, dipropylene glycol, higher polypropylene glycols having a molecular weight of up to 600, dibutylene glycol, higher polybutylene glycols having a molecular weight of up to 600, 4,4'-dihydroxy diphenyl propane, dihydroxy methyl hydroquinone, and the like.

Other low molecular weight polyols having a molecular weight of up to 600 which may be used in accordance with the present invention are ester diols, diol urethanes and diol ureas. Suitable ester diols correspond to the general formula

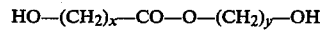

and

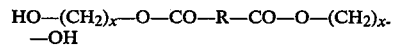

wherein
R represents an alkylene radical containing from 1 to 10, (preferably from 2 to 6) carbon atoms or a cycloalkylene or arylene radical containing from 6 to 10 carbon atoms;
x represents 2 to 6; and
y represents 3 to 5.

Examples of compounds corresponding to these formulae are δ-hydroxybutyl-ε-hydroxycaproic acid ester, ω-hydroxy-hexyl-γ-hydroxybutyric acid ester, adipic acid-bis-(β-hydroxyethyl)-ester and terephthalic acid-bis-(β-hydroxy-ethyl)-ester.

Diol urethanes which may be used in the present invention correspond to the general formula:

HO—(CH$_2$)$_x$—O—CO—NH—R'—NH—CO—O—(CH$_2$)—OH wherein

R' represents an alkylene radical containing from 2 to 15 (preferably from 2 to 6) carbon atoms or a cycloalkylene or arylene radical containing from 6 to 15 carbon atoms, and x represents a number of from 2 to 6.

Examples of such diol urethanes are 1,6-hexamethylene-bis-(-hydroxyethyl urethane) and 4,4'-diphenylmethane-bis-(-hydroxybutyl urethane). Diol ureas suitable to the present invention correspond to the general formula:

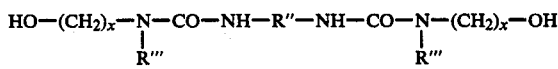

wherein

R'' represents an alkylene radical containing from 2 to 15 (preferably from 2 to 9) carbon atoms or a cycloalkylene or arylene radical containing from 6 to 15 carbon atoms, R''' represents hydrogen or a methyl group, and x represents the number 2 or 3.

Examples of such diol ureas are 4,4'-diphenyl methane-bis-(β-hydroxyethyl urea) and the compound

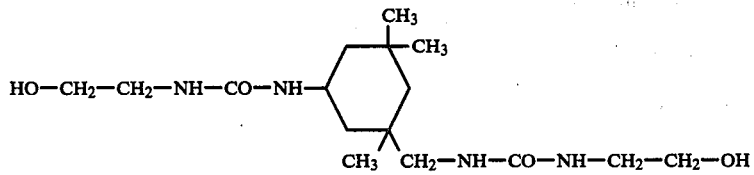

For certain purposes, it may be advantageous to use polyols containing sulfonate and/or phosphonate groups (German Offenlegungsschrift No. 2,719,372), such as the adduct of bisulfite with 1,4-butene diol or the alkoxylation product thereof.

The process according to the present invention is preferably used for producing compact moldings although blowing agents may be used. The blowing agents used may be water and/or readily volatile organic substances and/or dissolved inert gases. Suitable organic blowing agents include, e.g., acetone; ethyl acetate; methanol; ethanol; halogen substituted alkanes, such as methylene chloride, chloroform, ethylidene chloride, vinylidene chloride, monofluorotrichloromethane, chlorodifluoromethane or dichlorodifluoromethane, butane; hexane; heptane; diethyl ether; and the like. Suitable inert gases include nitrogen, air, carbon dioxide, and the like.

The effect of a blowing agent may also be obtained by adding compounds which decompose at temperatures above room temperature to liberate gas, for example, nitrogen. Examples include azo compounds, such as azoisobutyric acid nitrile. Other examples of blowing agents and details concerning the use of blowing agents may be found in Kunststoff-Handbuch, Volume VII, published by Vieweg and Hochtlen, Carl-Hanser-Verlag, Munich, 1966, pages 108 to 109, 453 to 455 and 507 to 510.

Surface-active additives (emulsifiers and foam stabilizers) may also be used according to the present invention. Suitable emulsifiers include the sodium salts of ricinoleic sulphonates or of fatty acids, or salts of fatty acids with amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

The most useful foam stabilizers are primarily water-soluble polyether siloxanes. These compounds generally have a polydimethylsiloxane group attached to a copolymer of ethylene oxide and propylene oxide. Foam stabilizers of this type are known and have been described, for example, in U.S. Pat. No. 2,764,565.

Known cell regulators, such as paraffins or fatty alcohols or dimethylpolysiloxanes, pigments, dyes, known flame retarding agents, such as bis-chloroethylphosphate or ammonium phosphate and polyphosphate, stabilizers against aging and weathering, plasticizers, fungistatic and bacteriostatic substances and fillers, such as barium sulphate, kieselguhr, carbon black or whiting, and preferably glass reinforcements in the form of flakes and/or fibers may also be used according to the present invention.

Other examples of surface active additives, foam stabilizers, cell regulators, stabilizers, flame retarding substances, plasticizers, dyes, fillers and fungistatic and bacteriostatic substances which may be used according to the present invention and details concerning the use and action of these additives are known and may be found in Kunststoff-Handbuch, Volume VII, published by Vieweg and Hochtlen, Carl-Hanser-Verlag, Munich, 1966, pages 103 to 113.

The quantity of polyisocyanate (component (a)) used in the process according to the present invention is preferably calculated so that the mixture has an isocyanate index of from 70 to 130, in particular from 90 to 110. By "isocyanate index" is meant the quotient of the number of isocyanate groups and the number of groups which are reactive with isocyanates multiplied by 100.

The reaction mixture is processed via the one-shot process. As is known in the art in the "one-shot" system, the reactive components are mixed simultaneously as opposed to the prepolymer process, wherein some of the components are prereacted. Thus, the components non-reactive with each other may first be blended and thereafter processed in a "one-shot" technique.

The known reaction injection molding technique (RIM process) may be used for carrying out the process according to the present invention. The quantity of reaction mixture (which is optionally foamable) introduced into the mold is chosen so that the molded article generally has a density of from 0.8 to 1.2 g/cc, preferably from 0.9 to 1.1 g/cc.

A starting temperature of from 10° C. to 50° C., preferably from 20° C. to 30° C., is chosen for the mixture introduced into the mold. The temperature of the mold itself is generally from 40° C. to 100° C., and preferably from 50° C. to 70° C.

Known mold-release agents of the type described, for example, in German Offenlegungsschriften Nos. 1,953,637 and 2,121,670, may also be used in the instant process.

The Examples which follow serve to illustrate the process of the invention without restricting it in any way. In the Examples, all quantities quoted represent parts by weight or percent by weight unless otherwise indicated. The following materials have been used in the Examples:

Polyol A: A 28 hydroxyl number glycerine-initiated polyether triol, which includes both propylene oxide and ethylene oxide units in a weight ratio of about 7 to 1.

Polyol B: A 28 hydroxyl number propylene glycol-initiated polyether diol, which has both propylene oxide and ethylene oxide units in a weight ratio of about 4 to 1.

Polyol C: A dispersion having an OH number of about 28 and consisting of a polyhydrazodicarbonamide in a glycerine initiated propylene oxide/ethylene oxide polyether (OH number of the polyether is about 35), and produced by reacting toluene diisocyanate and hydrazine hydrate in the polyether according to U.S. Pat. No. 4,042,537.

Extender D: DETDA, as an 80/20 mixture of 3,5-diethyl-2,4-toluenediamine and 3,5-diethyl-2,6-toluenediamine.

Extender E: A preparation of TEMPDA consisting of about 95% 2,4,6-triethyl-1,3-phenylene diamine.

Extender F: A 630 hydroxyl number propoxylated ethylene diamine-initiated polyether tetrol.

Extender G: 1,4-butanediol.

Polyisocyanate H: a modified isocyanate produced by reacting 4,4'-diphenylmethane diisocyanate with tripropylene glycol to give a liquid product having an NCO content of about 23% NCO.

Polyisocyanate I: a modified isocyanate prepared by reacting 4,4'-diphenylmethane diisocyanate in a weight ratio of approximately 6:1 with a 2:1 blend (by weight) of tripropylene glycol and a 370 hydroxyl number propoxylated sucrose/propylene glycol initiated polyether polyol, to give a liquid product having an NCO content of about 22% by weight.

Polyisocyanate J: a modified isocyanate prepared by reacting 4,4-diphenylmethane diisocyanate in a weight ratio of approximately 6:1 with a 2:1 blend (by weight) of tripropylene glycol and a 645 hydroxyl number propoxylated glycerine-initiated polyether triol, to give a liquid product having an NCO content of about 22% by weight.

Organto Tin Catalyst: Dibutyl tin dilaurate; T-12 supplied by M & T Chemical Company.

Amine Catalyst: Triethylene diamine; Dabco 33LV supplied by Air Products Company.

Reinforcement: 1/64" nominal glass flakes; Flakeglas by Owens Corning Fiberglas.

All physical properties were obtained from test panels prepared on a Hennecke Model HKA-500 RIM machine using Krauss-Maffei mixhead (Examples I through XI) or on a Cincinnati-Milacron RIMM-90 reinforced RIM machine (Examples XII through XVI). The mold had dimensions of 445×760×3.5 mm and had a 25.4 mm perpendicular lip. The processing conditions used were as follows: raw material temperature=95° F.; mold temperature=150° F.; mixing pressure=2,500 psi; and mold residence time=30 seconds.

Table I demonstrates that RIM materials with excellent overall physical properties can be obtained from formulations based on TEMPDA (Designated Extender E). Further, the TEMPDA is used at concentrations higher than DETA (Extender D) can be used. Table I also demonstrates that differently modified MDI isocyanates (H vs. I; Examples VI–VIII) can be used to give a different combination of physical properties. Example IX shows that a co-extender can be combined with TEMPDA to give an even higher flexural modulus material.

Table II shows properties on composites which have been reinforced by introduction of 1/64" glass flakes into the polyol blend. Properties were measured both parallel and perpendicular to the flow direction. Excellent physical properties are obtained (Examples XIII and XIV) with TEMPDA at concentrations higher than can be processed with DETA.

TABLE I

| Example # | I | II | III | IV | V | VI | VII | VIII | IX | X | XI |
|---|---|---|---|---|---|---|---|---|---|---|---|
| Polyol | A; 76.9 | B; 76.9 | B; 74.9 | A; 75.1 | A; 71.1 | A; 71.1 | A; 71.1 | A; 69.2 | A; 64.9 | A; 42.2/C; 30.8 | A; 42.2/C; 30.8 |
| Extender | D; 23.0 | D; 23.0 | D; 25.0 | E; 24.8 | E; 28.8 | E; 28.8 | E; 28.8 | E; 30.7 | E; 20.0/F; 15.0 | E; 26.9 | E; 26.9 |
| Isocyanate | H; 59 | H; 61 | H; 61 | H; 58.1 | H; 65.7 | H; 65.7 | I; 67.4 | I; 71.5 | H; 78.0 | H; 65.8 | I; 67.6 |
| Catalyst DBTDL | 0.1 | 0.1 | 0.1 | 0.1 | 0.1 | 0.1 | 0.1 | 0.1 | 0.1 | 0.1 | 0.1 |
| Density, pcf ASTM D-1622 | 62.1 | 62.4 | 62.4 | 62.0 | 63.1 | 64.9 | 64.9 | 64.9 | 64.3 | 63.0 | 66.1 |
| Hardness, Shore D ASTM D-2240 | 57 | — | — | 59 | 62 | — | — | — | — | — | — |
| Tear Strength, pli ASTM D-624 | 480 | — | — | 515 | 650 | — | — | — | — | — | — |
| Tensile Strength, psi ASTM D-412 | 3200 | 4200 | 4200 | 3400 | 4000 | 3900 | 3700 | 3900 | 3900 | 4100 | 4500 |
| Elongation, % ASTM D-412 | 200 | 390 | 360 | 230 | 240 | 180 | 100 | 100 | 40 | 160 | 150 |
| Flexural Modulus, psi | | | | | | | | | | | |
| @ 25° C. | 48700 | 50000 | 63000 | 53100 | 70500 | 67000 | 85700 | 98300 | 114300 | 95400 | 101000 |
| @ 30° C. | 123900 | 126000 | 146000 | 125500 | 166600 | 152400 | 185300 | 201400 | 237100 | 223600 | 215900 |
| @ 65° C. | 34500 | 36000 | 44000 | 38400 | 49600 | 45400 | 55100 | 69000 | 63900 | 60000 | 66400 |

TABLE I-continued

| | EXAMPLES OF NON-REINFORCED RIM FORMULATIONS | | | | | | | | | | |
|---|---|---|---|---|---|---|---|---|---|---|---|
| Example # | I | II | III | IV | V | VI | VII | VIII | IX | X | XI |
| ASTM D-740 | | | | | | | | | | | |
| Impact Strength, Notched Izod, ft lb/in | 9.6 | 12.4 | 14.1 | — | — | 8.4 | 3.9 | 3.8 | 2.6 | 4.0 | 3.75 |
| ASTM D-256 | | | | | | | | | | | |
| Heat Sag, in. | | | | | | | | | | | |
| 1 hr. @ 250° F., 4" OH | 0.1 | — | — | 0.14 | 0.04 | — | — | — | — | — | — |
| 1 hr. @ 250° F., 6" OH | — | 0.15 | 0.15 | — | — | 0.23 | 0.17 | 0.17 | 0.25 | 0.26 | 0.35 |
| 1 hr. @ 325° F., 4" OH | — | 0.45 | 0.30 | — | — | — | — | — | — | — | — |
| ASTM D-3769 | | | | | | | | | | | |

TABLE II

| | EXAMPLES OF REINFORCED RIM FORMULATIONS | | | | |
|---|---|---|---|---|---|
| Example # | XII | XIII | XIV | XV | XVI |
| Polyol | A; 76.8 | A; 71.0 | A; 71.0 | C; 74.8 | C; 74.8 |
| Extender | D; 18.0/G; 5.0 | E; 28.0 | E; 28.0 | E; 25.0 | E; 25.0 |
| Isocyanate | H; 71.3 | H; 67.9 | J; 69.7 | H; 60.2 | J; 61.9 |
| Catalyst (DBTDL/33LV) | 0.1/0.1 | 0.1/0.1 | 0.1/0.1 | 0.1/0.1 | 0.1/0.1 |
| Reinforcement % (OCF 1/64" flake glass) | 20 | 20 | 20 | 20 | 20 |
| Direction (= Parallel = Perpendicular) | | | | | |
| Density, pcf | 74 74 | 74 74 | 74 74 | 74 74 | 74 74 |
| Tensile Strength, psi | 4200 4200 | 4000 4000 | 4500 4500 | 4500 4500 | 4500 4500 |
| Elongation, % | 30 30 | 40 40 | 40 40 | 30 30 | 30 30 |
| Flexural Modulus, psi | | | | | |
| @ 25° C. | 220000 180000 | 226000 175000 | 253000 230000 | 307000 281000 | 326000 278000 |
| @ 30° C. | 454000 400000 | 405000 390000 | 411000 406000 | 542000 470000 | 542000 425000 |
| @ 65° C. | 116000 111000 | 156000 136000 | 166000 146000 | 208000 215000 | 215000 212000 |
| Impact Strength Notched Izod ft. lb/in | 2.8 2.9 | 2.8 2.8 | 2.8 3.0 | 1.7 1.7 | 1.7 1.8 |
| Heat Sag, in | | | | | |
| 1 hr. @ 250° F., 4" OH | .02 .02 | 0.0 0.0 | .02 0.0 | .04 0.0 | .02 .02 |
| 1 hr. @ 250° F., 6" OH | .16 .22 | .08 .06 | .04 .02 | .02 .04 | .04 .02 |
| 1 hr. @ 325° F., 4" OH | .12 .22 | .02 .08 | .08 .12 | .04 .08 | .08 .08 |

What is claimed is:

1. In a process for the production of polyurethane elastomer moldings by reacting a reaction mixture in a closed mold, the improvement wherein said reaction mixture comprises:
    (a) an organic polyisocyanate;
    (b) an organic active hydrogen group-containing compound having a molecular weight of from 1800 to 12,000 and containing at least two active hydrogen groups,
    (c) 1,3,5-triethyl-2-6-diamino benzene and, optionally
    (d) a catalyst for the reaction between hydroxyl groups and isocyanate groups,
wherein component (c) is present in an amount of from 25 to 35 percent by weight based on the combined weight of components (b) and (c), wherein the amounts of components (a), (b) and (c) are such that the isocyanate index of the reaction mixture is from about 90 to 110, and wherein all of said components are processed via a one-shot process whereby (a) is mixed simultaneously either with (b), (c) and (d) or with a non-reacted premixture of some or all of (b), (c) and (d).

2. The process of claim 1 wherein component (b) is a polyether polyol and component (d) is present in an amount of from 0.001 to 10% by weight based on the amount of component (b).

3. The process of claim 1 wherein component (b) is a polyether polyamine.

4. The process of claim 1, wherein said reaction mixture also includes a low molecular weight hydroxy functional organic compound having from 2 to 4 OH groups.

5. The process of claim 1 wherein said polyisocyanate is an aromatic polyisocyanate which is liquid at the processing temperature.

6. The process of claim 5 wherein said isocyanate is based on 4,4'-diisocyanato-diphenyl methane.

7. The process of claim 1 wherein said reaction mixture also includes glass reinforcement in the form of fibers and/or flakes.

8. The process of claim 1 wherein the isocyanate index is from 90 to 110.

9. An active hydrogen containing mixture comprising (i) an organic active hydrogen group-containing compound having a molecular weight of from 1800 to 12,000 and containing at least two active hydrogens, and (ii) from about 25 to about 35 percent by weight based on the weight of (i) and (ii) of 1,3,5-triethyl-2,6-diaminobenzene.

10. The composition of claim 9, wherein said component (i) is a polyether polyol.

11. The composition of claim 9, wherein said component (i) is a polyether polyamine.

12. An active hydrogen group containing mixture comprising
    (i) an organic active hydrogen group containing compound having a molecular weight of from 1800 to 12,000 and containing at least two active hydrogens,
(ii) 1,3,5-triethyl-2,6-diamino benzene, and
(iii) from 0 to 95 percent by weight based on the combined weight of (ii) and (iii) of a low molecular weight hydroxy functional organic compound having from 2 to 4 hydroxyl groups, wherein the total weight of (ii) and (iii) is from about 25 to about 35 percent by weight based on the weight of (i), (ii) and (iii).

13. The composition of claim 12, wherein said component (i) is a polyether polyol.

14. The composition of claim 12, wherein said component (i) is a polyether polyamine.

* * * * *